US012744827B2

(12) United States Patent
Xie et al.

(10) Patent No.: US 12,744,827 B2
(45) Date of Patent: Sep. 22, 2026

(54) TRANSMISSION METHOD AND TRANSMISSION PROCESSING METHOD OF MULTICAST SERVICE AND RELATED DEVICE

(71) Applicant: VIVO MOBILE COMMUNICATION CO., LTD., Chang'an Dongguan (CN)

(72) Inventors: Zhenhua Xie, Chang'an Dongguan (CN); Yanxia Zhang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 546 days.

(21) Appl. No.: 17/843,359

(22) Filed: Jun. 17, 2022

(65) Prior Publication Data

US 2022/0322050 A1 Oct. 6, 2022

Related U.S. Application Data

(63) Continuation of application No. PCT/CN2020/141913, filed on Dec. 31, 2020.

(30) Foreign Application Priority Data

Jan. 2, 2020 (CN) ......................... 202010001920.0

(51) Int. Cl.

*H04L 65/611* (2022.01)
*H04L 65/1069* (2022.01)
*H04L 65/612* (2022.01)
*H04L 65/65* (2022.01)
*H04W 4/06* (2009.01)

(52) U.S. Cl.

CPC ........ *H04L 65/611* (2022.05); *H04L 65/1069* (2013.01); *H04L 65/612* (2022.05); *H04L 65/65* (2022.05); *H04W 4/06* (2013.01)

(58) Field of Classification Search

CPC .... H04W 4/06; H04W 76/40; H04L 65/1069; H04L 65/611; H04L 65/612; H04L 65/65; H04L 65/1066

See application file for complete search history.

(56) References Cited

U.S. PATENT DOCUMENTS 11,259,361 B2 2/2022 Huang et al.
2009/0196213 A1 8/2009 Zhong et al.
2012/0263089 A1 10/2012 Gupta et al.

(Continued)

FOREIGN PATENT DOCUMENTS

CN 101163260 A 4/2008
CN 102158918 A 8/2011

(Continued)

OTHER PUBLICATIONS

Written Opinion and International Search Report dated Mar. 23, 2021 as received in Application No. PCT/CN2020/141913.

(Continued)

*Primary Examiner* — Justin T Van Roie
(74) *Attorney, Agent, or Firm* — BROOKS KUSHMAN P.C.

(57) ABSTRACT

A transmission method and a transmission processing method of multicast service and a related device are provided. The method includes: receiving a unicast-to-multicast request sent by a network device for a multicast service; and receiving the multicast service through a target mode, where the target mode includes a unicast mode and/or a multicast mode.

14 Claims, 5 Drawing Sheets

(56) References Cited

U.S. PATENT DOCUMENTS

| | | | |
|---|---|---|---|
| 2013/0028118 | A1 | 1/2013 | Cherian et al. |
| 2014/0177504 | A1 | 6/2014 | Sayeed et al. |
| 2018/0359614 | A1 | 12/2018 | Yu et al. |
| 2019/0028854 | A1 | 1/2019 | Hua et al. |
| 2020/0323024 | A1 | 10/2020 | Huang et al. |

FOREIGN PATENT DOCUMENTS

| | | | |
|---|---|---|---|
| CN | 103797873 | A | 5/2014 |
| CN | 104756587 | A | 7/2015 |
| CN | 104918204 | A | 9/2015 |
| CN | 108781479 | A | 11/2018 |
| CN | 109982266 | A | 7/2019 |
| EP | 2690907 | A1 | 1/2014 |
| EP | 3 437 348 | A1 | 2/2019 |
| WO | 2017/167648 | A1 | 10/2017 |
| WO | 2019/129212 | A1 | 7/2019 |
| WO | 2019/223005 | A1 | 11/2019 |

OTHER PUBLICATIONS

CN Office Action dated Nov. 9, 2021 as received in Application No. 202010001920.0.

Second Office Action for Indian Application No. 202227035034, dated Mar. 11, 2024, 2 Pages.

"3rd Generation Partnership Project; Technical Specification Group Services and System Aspects; Group Communication System Enablers for LTE (GCSE_LTE); Stage 2 (Release 15)," 3GPP TS 23.468, V15.1.0, pp. 1-32, (Sep. 24, 2019).

Extended European Search Report dated May 23, 2023 as received in Application No. 20909737.7.

JP Office Action dated Jun. 20, 2023 as received in Application No. 2022-540753.

Second Office Action for European Application No. 20909737.7, dated Sep. 4, 2024, 6 Pages.

Send a unicast-to-multicast request for a multicast service to a first terminal, where the unicast-to-multicast request is used to trigger the first terminal to receive the multicast service according to a target mode
401
FIG. 4
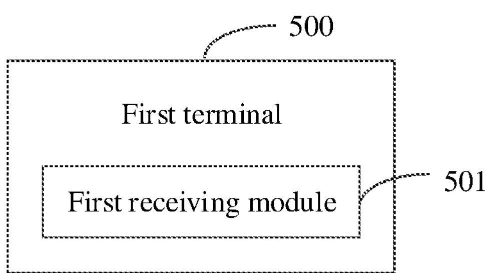
FIG. 5
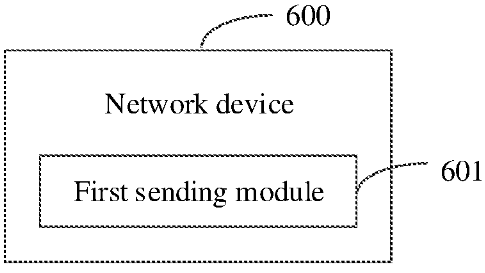
FIG. 6

TRANSMISSION METHOD AND TRANSMISSION PROCESSING METHOD OF MULTICAST SERVICE AND RELATED DEVICE

CROSS-REFERENCE TO RELATED APPLICATIONS

This application is continuation application of PCT International Application No. PCT/CN2020/141913 filed on Dec. 31, 2020, which claims priority to Chinese Patent Application No. 202010001920.0, filed in China on Jan. 2, 2020, which is incorporated herein by reference in its entirety.

TECHNICAL FIELD

The present disclosure relates to the field of communications technologies, and in particular, to a transmission method and a transmission processing method of multicast service and a related device.

BACKGROUND

In a communications system, transmitted services include a unicast service and a multicast service. The 3rd Generation Partnership Project (3GPP) has defined a multicast service user join procedure of a mobile network, so that a network device can directly send the multicast service by multicast or broadcast. In a new radio (NR) system, application of the multicast service to the NR system has not been discussed. How to realize transmission of the multicast service has become an urgent problem to be resolved.

SUMMARY

According to a first aspect, an embodiment of the present disclosure provides a transmission method of multicast service, applied to a first terminal and including:

- receiving a unicast-to-multicast request sent by a network device for a multicast service; and
- receiving the multicast service through a target mode, where the target mode includes a unicast mode and/or a multicast mode.

According to a second aspect, an embodiment of the present disclosure further provides a transmission processing method of multicast service, applied to a network device and including:

sending a unicast-to-multicast request for a multicast service to a first terminal, where the unicast-to-multicast request is used to trigger the first terminal to receive the multicast service through a target mode, and the target mode includes a unicast mode and/or a multicast mode.

According to a third aspect, an embodiment of the present disclosure further provides a first terminal, including:

a first receiving module, configured to receive a unicast-to-multicast request sent by a network device for a multicast service; and receive the multicast service through a target mode, where the target mode includes a unicast mode and/or a multicast mode.

According to a fourth aspect, an embodiment of the present disclosure further provides a network device, including:

a first sending module, configured to send a unicast-to-multicast request for a multicast service to a first terminal, where the unicast-to-multicast request is used to trigger the first terminal to receive the multicast service through a target mode, and the target mode includes a unicast mode and/or a multicast mode.

According to a fifth aspect, an embodiment of the present disclosure further provides a first terminal, including a memory, a processor, and a program stored in the memory and capable of running on the processor, where when the program is executed by the processor, the steps of the foregoing transmission method of multicast service are implemented.

According to a sixth aspect, an embodiment of the present disclosure further provides a network device, including a memory, a processor, and a program stored in the memory and capable of running on the processor, where when the program is executed by the processor, the steps of the foregoing transmission processing method of multicast service are implemented.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and persons of ordinary skill in the art may still derive other drawings from these accompanying drawings without creative efforts.

FIG. 4 is a flowchart of a transmission processing method of multicast service according to an embodiment of the present disclosure;

FIG. 5 is a structural diagram of a first terminal according to an embodiment of the present disclosure;

FIG. 6 is a structural diagram of a network device according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In the specification and claims of this application, the term “include” and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates the following three cases: only A, only B, or both A and B.

In the embodiments of the present disclosure, the word such as "an example" or "for example" is used to represent giving an example, an instance, or an illustration. Any embodiment or design solution described as "an example" or "for example" in the embodiments of the present disclosure shall not be interpreted to be more preferential or advantageous than other embodiments or design solutions. To be precise, the terms such as "an example" or "for example" are intended to present a related concept in a specific manner.

The following describes the embodiments of the present disclosure with reference to the accompanying drawings. A transmission method, a transmission processing method, and a related device provided in the embodiments of the present disclosure may be applied to a wireless communications system. The wireless communications system may be a 5G system, or an evolved long term evolution (eLTE) system, or a later evolved communications system.

Figure 1:
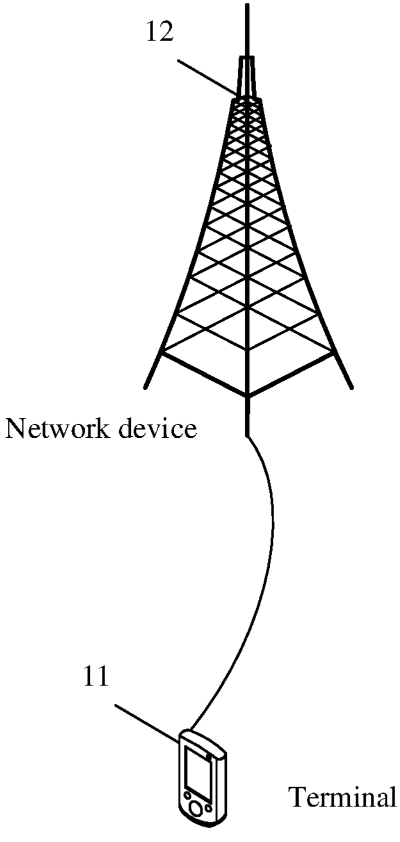
FIG. 1 is a structural diagram of a network system to which an embodiment of the present disclosure may be applied.

Referring to FIG. 1, FIG. 1 is a structural diagram of a network system to which an embodiment of the present disclosure may be applied. As shown in FIG. 1, the network system includes a terminal 11 and a network device 12. The terminal 11 may be a user terminal or another terminal-side device such as a mobile phone, a tablet personal computer, a laptop computer, a personal digital assistant (PDA), a mobile internet device (MID), or a wearable device. It should be noted that a specific type of the terminal 11 is not limited in the embodiments of the present disclosure. The network device 12 may be a 5G base station, or a base station of a later version, or a base station in another communications system, or is referred to as a NodeB, or an evolved NodeB, or a transmission and reception point (TRP), or an access point (AP), or another term in the art, as long as same technical effects are achieved. The network device is not limited to a specific technical term. In addition, the network device 12 may be a master node (MN) or a secondary node (SN). It should be noted that, in the embodiments of the present disclosure, the 5G base station is used as only an example, but the network device is not limited to any specific type.

Figure 2:
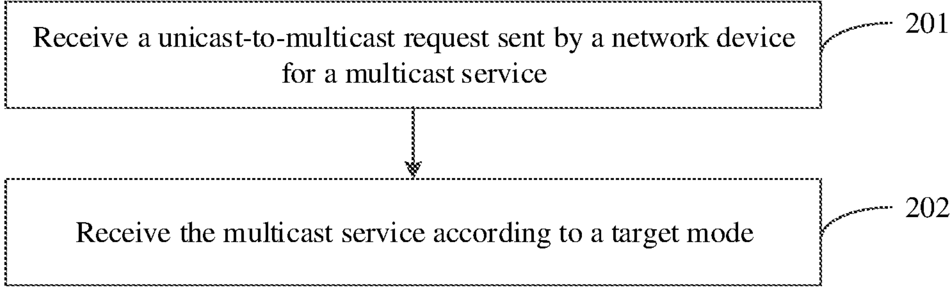
FIG. 2 is a flowchart of a transmission method of multicast service according to an embodiment of the present disclosure.

Referring to FIG. 2, FIG. 2 is a flowchart of a transmission method of multicast service according to an embodiment of the present disclosure. The method is applied to a first terminal. As shown in FIG. 2, the method includes the following steps:

Step 201: Receive a unicast-to-multicast request sent by a network device for a multicast service.

Step 202: Receive the multicast service through a target mode, where the target mode includes a unicast mode and/or a multicast mode.

In this embodiment of the present disclosure, the network device may provide the multicast service in the unicast mode or the multicast mode. For example, when a quantity of terminals (that is, users) that are receiving the multicast service in the unicast mode is small, the network device may provide the multicast service for the terminals in the unicast mode. The first terminal may be understood as a terminal that receives the multicast service in the unicast mode.

A triggering manner for triggering the unicast-to-multicast request sent by the network device for the multicast service may be set according to an actual requirement. For example, in one embodiment, any one of the following triggering manners may be included:

Manner 1: A second terminal sends a first multicast session establishment request.

Manner 2: A specific first terminal sends a multicast session establishment request.

Manner 3: The network device is triggered based on a quantity of terminals that are currently receiving the multicast service in the unicast mode.

Manner 4: The network device is triggered based on a quantity of terminals that request to receive the multicast service.

For the manner 1, the second terminal may be understood as a terminal other than the first terminal. For example, when being interested in the multicast service, the second terminal may send the first multicast session establishment request to request the network device to establish a multicast mode data channel for the multicast service or to request the network device to activate a multicast mode data channel for the multicast service. In this case, the network device may be triggered to send the unicast-to-multicast request to the first terminal.

For the manner 2, the specific first terminal may actively send the multicast session establishment request to the network device. For example, in a case of determining that the specific first terminal is within a service area of the multicast service, the specific first terminal sends the multicast session establishment request to the network device, to request the network device to establish a multicast mode data channel for the multicast service. In this case, the network device may be triggered to send the unicast-to-multicast request to the first terminal.

For the manner 3, a second preset value may be protocol-predefined. When a quantity of terminals that are currently receiving the multicast service in the unicast mode is greater than the second present value, the network device may be triggered to send the unicast-to-multicast request to the first terminal.

For the manner 4, the network device may collect a total quantity of terminals of the multicast service. When the total quantity is greater than a third preset value, the network device may be triggered to send the unicast-to-multicast request to the first terminal.

It should be noted that in some embodiments, the triggering may also be based on combination of two manners, for example, based on the manner 1 and the manner 3, or based on the manner 1 and the manner 4. In other words, when conditions corresponding to the manner 1 and manner 3 are met, the network device is triggered to send the unicast-to-multicast request to the first terminal; or when conditions corresponding to the manner 1 and manner 4 are met, the network device is triggered to send the unicast-to-multicast request to the first terminal.

Optionally, the first terminal may determine, based on the unicast-to-multicast request, to receive the multicast service through the target mode. In this embodiment, the receiving the multicast service through the target mode may be understood as receiving remaining service data of the multicast service (or remaining multicast service) through the target mode.

In one embodiment, the multicast service may continue to be received in the unicast mode, may be received in both the multicast mode and the unicast mode, or may be received only in the unicast mode. It should be understood that the receiving the multicast service through the multicast mode may be understood that the terminal may receive service data of the multicast service or may not receive service data of the multicast service when attempting to receive the multicast service through the multicast mode.

Optionally, the unicast-to-multicast request may be application layer data.

In this embodiment of the present disclosure, the unicast-to-multicast request sent by the network device for the multicast service is received; and the multicast service is received through the target mode, where the target mode includes the unicast mode and/or the multicast mode. In this way, transmission of the multicast service in an NR system is achieved. In addition, because the unicast-to-multicast request can be used to change a transmission mode of the multicast service, switching from the unicast mode to the multicast mode can be implemented. Therefore, according to the embodiments of the present disclosure, resources occupied by the multicast service can be reduced, improving resource utilization.

Optionally, in one embodiment, after the receiving a unicast-to-multicast request sent by a network device for a multicast service, the method further includes:

determining the target mode based on a service area of the multicast service.

In this embodiment of the present disclosure, the target mode may be determined based on whether the terminal is within the service area of the multicast service, and after the target mode is determined, the multicast service is received through the target mode. For example, in one embodiment, the first terminal is within the service area of the multicast service, it is determined that the target mode includes the multicast mode. Further, the target mode may further include the unicast mode. In another embodiment, when the first terminal is outside the service area of the multicast service, it is determined that the target mode includes the unicast mode. It should be understood that when the first terminal is within the service area of the multicast service, it may be understood as determining a state that the first terminal is within the service area of the multicast service, for example, a condition in which the first terminal is within the service area of the multicast service.

It should be understood that service data of the multicast service may be received in the multicast mode, or may not be received in the multicast mode. In one optional embodiment, to ensure normal receiving of the multicast service, the multicast service can always be received in the unicast mode. In other words, the target mode may include the unicast mode, or the target mode includes the multicast mode and the unicast mode.

Optionally, the target mode may be determined based on multicast service information provided by the network device. The multicast service information may be a multimedia broadcast multicast service (MBMS) service list. For example, the network device may provide, by broadcast or dedicated signaling, the MBMS service list for a terminal accessing the network device. The terminal accessing the network device may determine whether the terminal is within the service area of the multicast service based on the MBMS service list.

It should be noted that, to improve understanding consistency between the network device and the first terminal to better control targeted switching from the unicast mode to the multicast mode, the first terminal may further perform corresponding terminal behaviors according to the following situations, which is described in detail below.

Optionally, in one embodiment, the first terminal may further send a response message to the network device based on the unicast-to-multicast request, to notify the network device of whether the first terminal agrees to receive the multicast service through the multicast mode. For example, in one embodiment, the method further includes:

sending a first response message to the network device when the first terminal is within the service area of the multicast service, where the first response message is used to indicate that the first terminal agrees to receive the multicast service through the multicast mode.

In this embodiment, when being within the service area of the multicast service, the first terminal may send the first response message. In this case, the target mode may include the multicast mode and the unicast mode. In other words, when the first terminal is within the service area of the multicast service, the first terminal receives the multicast service through the unicast mode and the multicast mode.

Optionally, the first response message is used to indicate that the first terminal agrees to receive the multicast service through the multicast mode. It can also be understood that the first response message is used to indicate that the first terminal is within the service area of the multicast service.

Further, when the first terminal is outside the service area of the multicast service, the first terminal may not send the response message, or may send a second response message. For example, in this embodiment, the method further includes:

sending a second response message to the network device when the first terminal is outside the service area of the multicast service, where the second response message is used to indicate that the first terminal rejects to receive the multicast service through the multicast mode.

In this embodiment, the second response message is used to indicate that the first terminal rejects to receive the multicast service through the multicast mode. It can also be understood that the second response message is used to indicate that the first terminal is outside the service area of the multicast service.

Optionally, in another embodiment, the method further includes:

sending a second response message to the network device when the first terminal is within the service area of the multicast service, where the second response message is used to indicate that the first terminal rejects to receive the multicast service through the multicast mode.

In an embodiment of the present disclosure, the network device may further perform the following behaviors after sending the unicast-to-multicast request for the multicast service to the first terminal:

- receiving a response message sent by the first terminal for the unicast-to-multicast request;
- determining a transmission mode of the multicast service based on the response message; and
- sending the multicast service through the transmission mode, where the transmission mode includes the unicast mode and/or the multicast mode.

It should be noted that the network device may determine, based on the response message sent by the first terminal for the unicast-to-multicast request, a quantity value of the first terminals that agree to receive the multicast service through the multicast mode, and determine the transmission mode of the network device for the multicast service based on a relationship between the quantity value and a first preset value. For example, when the quantity value is greater than the first preset value, it is determined that the transmission mode includes the multicast mode. The first preset value may be protocol-defined, or may be determined by the network device itself, which is not further limited herein.

Optionally, in another embodiment, the method further includes:

sending a second multicast session join request for the multicast service to the network device when the first terminal is within the service area of the multicast service.

In this embodiment, in a case of determining that the first terminal is within the service area of the multicast service, the first terminal may send the second multicast session join request for the multicast service to the network device, to request to establish a multicast mode data channel of the multicast service. For example, when the first terminal is within the service area of the multicast service, but a multicast link (that is, the multicast mode data channel) of the multicast service has not been established, the first terminal initiates a multicast session establishment procedure to request to establish the multicast mode data channel. In this embodiment of the present disclosure, the first terminal sends the second multicast session join request again, to request the network device to establish the multicast mode data channel of the multicast service. This can improve understanding consistency between the network device and the first terminal, to enable the network device to control switching from the unicast mode to the multicast mode more accurately.

It should be noted that the first terminal receiving the multicast service through the multicast mode may specifically include the following steps:

receiving target information carried in a cell system message, where the target information is used to indicate a receiving method corresponding to the multicast mode of the multicast service; and receiving the multicast service in the multicast mode based on the target information.

Further, in one embodiment, in a case that the target mode includes the unicast mode and the multicast mode, the method further includes:

sending a first request message to the network device when service data of the multicast service has been received in the multicast mode, where the first request message is used to request to deactivate a unicast mode data channel.

In this embodiment of the present disclosure, the deactivating the unicast mode data channel may be understood as releasing a protocol data unit (PDU) session or a radio resource control (RRC) connection. The unicast mode data channel is deactivated after the service data of the multicast service has been received in the multicast mode, thereby reducing resource occupation of the multicast service.

Further, in one embodiment, in a case that the target mode includes the unicast mode and the multicast mode, the method further includes:

receiving the multicast service through the unicast mode when no service data of the multicast service has been received in the multicast mode in a preset time period.

In this embodiment of the present disclosure, the first terminal may maintain a timer. If no service data of the multicast service has been received in the multicast mode during runtime of the timer, the first terminal may still receive the multicast service in the unicast mode. For example, after receiving the unicast-to-multicast request, the first terminal starts the timer. If the first terminal receives no service data of the multicast service in the multicast mode before the timer expires, the first terminal determines that the network device does not switch the multicast service from the unicast mode to the multicast mode, so that the first terminal can still use the unicast mode to receive the multicast service, and no longer attempts to receive the multicast service in the multicast mode.

Further, if the first terminal receives the service data of the multicast service in the multicast mode before the timer expires, the first terminal may further request to deactivate the unicast mode data channel, to reduce resource occupation of the multicast service. In other words, in a case that the target mode includes the unicast mode and the multicast mode, the method further includes:

sending a second request message to the network device when service data of the multicast service has been received in the multicast mode in a preset time period, where the second request message is used to deactivate a unicast mode data channel.

Further, in an optional embodiment, the network device may further directly indicate a receiving mode of the first terminal by using indication information. For example, after determining a transmission mode (the unicast mode and/or the multicast mode) of the multicast service, the network device sends indication information to the first terminal, where the indication information is used to indicate the first terminal within a service area of the multicast service to receive the multicast service in the multicast or unicast mode.

The indication information may be used to indicate the first terminal within the service area of the multicast service to receive the multicast service in the multicast or unicast mode. In this case, the first terminal includes the following behaviors:

In one embodiment, in a case that the target mode includes the unicast mode and the multicast mode, the method further includes:

receiving the multicast service through the multicast mode when the first terminal is within the service area of the multicast service and has received first indication information sent by the network device; and sending a third request message to the network device, where the third request message is used to deactivate a unicast mode data channel; where the first indication information is used to indicate to receive the multicast service through the multicast mode.

In this embodiment of the present disclosure, because the unicast mode data channel is deactivated after the first indication information has been received, occupied resources in the multicast mode can be reduced.

In another embodiment, in a case that the target mode includes the unicast mode and the multicast mode, the method further includes:

receiving the multicast service through the unicast mode when the first terminal is within the service area of the multicast service and has received second indication information sent by the network device, where the second indication information is used to indicate to receive the multicast service through the unicast mode.

In this embodiment of the present disclosure, the second indication information is used to indicate the first terminal to receive the multicast service through the unicast mode, so that the first terminal does not need to attempt to receive the multicast service through the multicast mode again, thereby ensuring understanding consistency between the network device and the first terminal and reducing power consumption of the first terminal.

It should be noted that the first terminal outside the service area of the multicast service may be understood as always receiving the multicast service in the unicast mode. Further, when being switched from outside the service area of the multicast service to within the service area of the multicast service, the first terminal may also be triggered again to attempt to receive the multicast service in the multicast mode. In addition, in this embodiment of the present disclosure, all or some of the first terminals within the service area of the multicast service may be switched from the unicast mode to the multicast mode.

Figure 3:
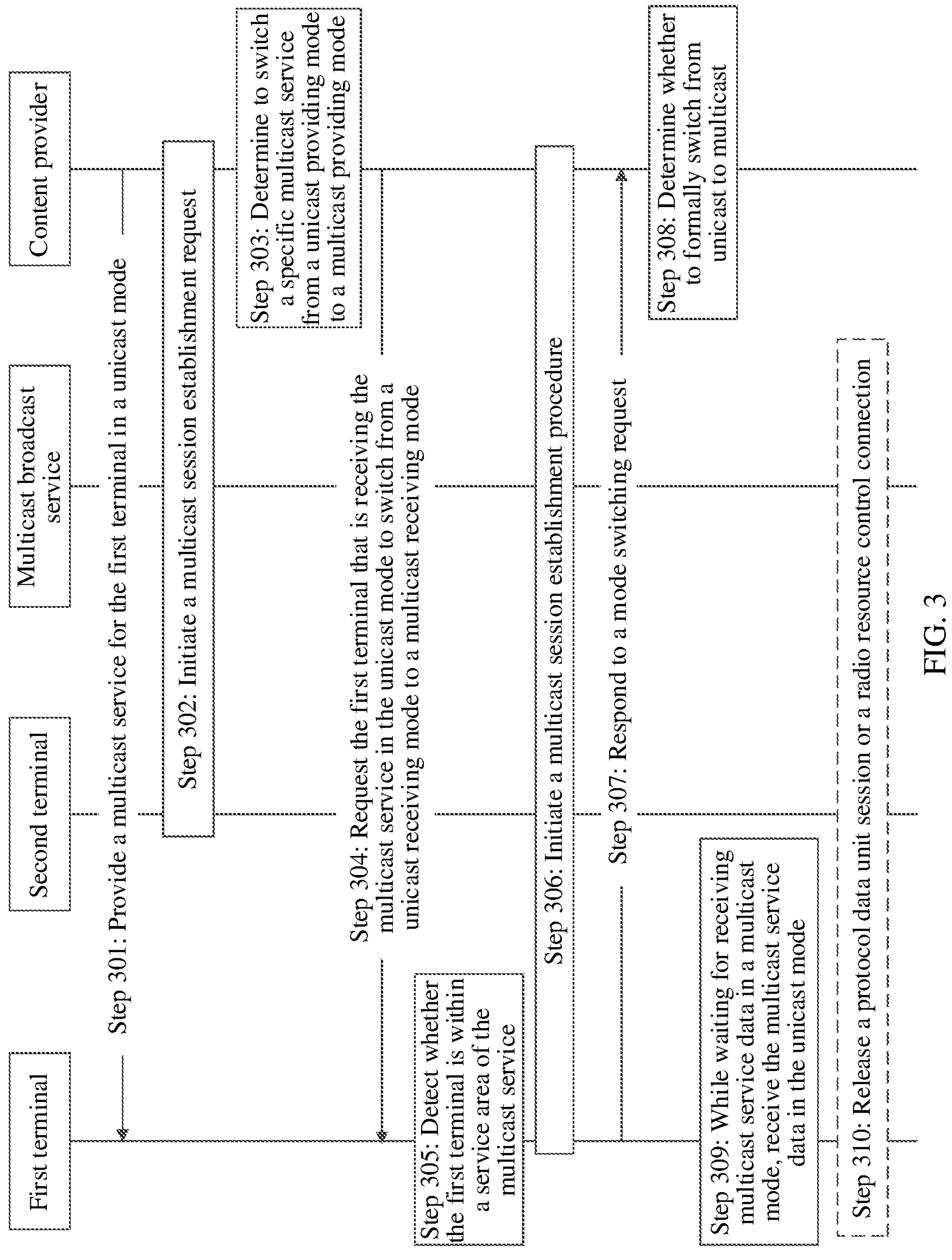
FIG. 3 is a flowchart of a transmission method of another multicast service according to an embodiment of the present disclosure.

For better understanding of the present disclosure, an implementation process of the present disclosure is described in detail below with reference to FIG. 3. As shown in FIG. 3, the following steps are included.

Step 301: Provide a multicast service for a first terminal in a unicast mode. For example, when a quantity of users that receive a multicast service 1 is small, a content provider provides the multicast service for a plurality of first terminals in the unicast mode.

Step 302: A second terminal initiates a multicast session establishment request. In other words, when being interested in a specific multicast service, the second terminal may initiate the multicast session establishment request. For example, the multicast service 1 is being provided in the unicast mode, and a new user terminal (that is, the second terminal) detects that it is within a service area of the multicast service, and initiates a multicast session establishment procedure to request to join a multicast session. Optionally, the second terminal may send a multicast session establishment request message, where the multicast session establishment request message may carry multicast service information (for example, Multicast IP or a multicast group identifier (Temporary Mobile Group Identifier, TMGI)). Alternatively, the second terminal may send a unicast session establishment request message, where the unicast session establishment request message carries multicast service information to represent the multicast session establishment request. The unicast session establishment request message may be understood as a PDU session establishment request message (PDU Session Establishment Request).

Step 303: The content provider (that is, a multicast broadcast service (MBS) content provider) determines to switch a specific multicast service from a unicast providing mode to a multicast providing mode. For example, the content provider counts a total quantity of terminals that are receiving or request to receive the multicast service. If the total quantity of users exceeds a preset threshold, the content provider determines to switch from the unicast providing mode to the multicast proving mode.

Step 304: The content provider requests the first terminal that is receiving the multicast service in the unicast mode to switch from a unicast receiving mode to a multicast receiving mode. The request information may be sent through application layer data.

Step 305: The first terminal that performs receiving in the unicast mode detects whether it is within a service area of the multicast service. For example, the first terminal determines, by detecting a system message of a nearby cell, whether the cell provides the multicast service. If the system message of the cell indicates that the cell provides the multicast service, the first terminal determines that the first terminal is within a service area of the multicast service. Otherwise, the first terminal determines that the first terminal is not within a service area of the multicast service.

Step 306: Optionally, if the first terminal that performs receiving in the unicast mode detects that the first terminal is within the service area of the multicast service, the first terminal initiates the multicast session establishment procedure. For example, when the first terminal is within the service area of the multicast service, but a multicast link of the multicast service has not been established, the first terminal initiates the multicast session establishment procedure to request to establish a multicast channel.

Step 307: Optionally, if the first terminal detects that the first terminal is within the service area of the multicast service, the first terminal responds to a mode switching request. For example, the first terminal is within the service area of the multicast service, and receives the unicast-to-multicast mode switching request, the first terminal replies that it agrees to switch from the unicast receiving mode to the multicast receiving mode. The first terminal may reply to the mode switching request through an application layer (for example, an IP packet).

Step 308: The content provider receives the mode switching response of the first terminal, and determines whether to formally switch from unicast to multicast. For example, the determining may be based on a total quantity of received mode switching responses. If the total quantity is greater than a preset threshold, the content provider formally determines to switch from unicast to multicast.

Step 309: While waiting for receiving multicast service data in the multicast mode, the first terminal receives the multicast service data in the unicast mode. For example, the first terminal receives the multicast service data at a specified time-frequency location by using a receiving method of the multicast service provided by a network side (for example, a cell that can provide a multicast service indicates a receiving method of the multicast service in a system message, and the first terminal knows, by reading the system message of the cell, how to receive data).

Step 310: If the multicast service data has been received in the multicast mode, release a protocol data unit session or a radio resource control connection. For example, if the first terminal receives the multicast service data at a specified time-frequency location by using a receiving method of the multicast service provided by a network side, the first terminal determines that a network device has switched the multicast service from the unicast providing mode to the multicast providing mode, and initiates a PDU session release procedure to request to release a unicast link. Additionally, the first terminal initiates an RRC connection release procedure to request to enter an idle state. For example, when having no other unicast service to receive except the multicast service, the first terminal requests to release the RRC connection and enter the idle state.

Optionally, in one embodiment, the first terminal may further maintain a timer. If no multicast data has been received in the multicast mode during runtime of the timer, the first terminal still uses a unicast receiving mode. For example, the first terminal starts a timer after sending a mode switching response request. If the first terminal receives no multicast data in the multicast mode before the timer expires, the first terminal determines that the network device does not switch from the unicast providing mode to the multicast providing mode. In this case, the first terminal still uses the unicast receiving mode, and no longer attempts to receive the multicast data in the multicast mode.

Optionally, in one embodiment, the network device may indicate the first terminal to switch the multicast service from the unicast mode to the multicast mode, and the first terminal initiates a PDU session release procedure to request to release the unicast link or initiates an RRC connection release procedure to request to enter the idle state. For example, when the network device indicates the first terminal that the remaining multicast service is formally switched from the unicast providing mode to the multicast providing mode, the first terminal may release the unicast link of the multicast service, and receive the multicast service in the multicast mode.

Optionally, in one embodiment, when the network device indicates the first terminal that the multicast service continues to be provided in the unicast mode, the first terminal continues to perform receiving in the unicast mode. For example, when the network device indicates the first terminal that the remaining multicast service continues to be provided in the unicast mode, the first terminal continues to perform receiving in the unicast mode, and no longer attempts to perform receiving in the multicast mode, for example, no longer detects a multicast resource location.

Referring to FIG. 4, FIG. 4 is a flowchart of a transmission processing method of multicast service according to an embodiment of the present disclosure. The method is applied to a network device. As shown in FIG. 4, the method includes the following step:

Step 401: Send a unicast-to-multicast request for a multicast service to a first terminal, where the unicast-to-multicast request is used to trigger the first terminal to receive the multicast service through a target mode, and the target mode includes a unicast mode and/or a multicast mode.

Optionally, the sending a unicast-to-multicast request for a multicast service to a first terminal includes:

sending the unicast-to-multicast request for the multicast service to the first terminal when a first multicast session join request sent by a second terminal for the multicast service has been received.

Optionally, the first multicast session join request includes at least one of the following:

a multicast session establishment request; and a unicast session establishment request, where the unicast session establishment request carries third indication information, and the third indication information is used to indicate to establish a multicast mode data channel of the multicast service.

Optionally, after the sending a unicast-to-multicast request for a multicast service to a first terminal, the method further includes:

receiving a response message sent by the first terminal for the unicast-to-multicast request;

determining a transmission mode of the multicast service based on the response message; and sending the multicast service through the transmission mode, where the transmission mode includes the unicast mode and/or the multicast mode.

Optionally, when the first terminal is within a service area of the multicast service, the response message corresponding to the first terminal is a first response message, and the first response message is used to indicate that the first terminal agrees to receive the multicast service through the multicast mode.

Optionally, when the first terminal is within a service area of the multicast service, the response message corresponding to the first terminal is a second response message, and the second response message is used to indicate that the first terminal rejects to receive the multicast service through the multicast mode.

Optionally, when the first terminal is outside a service area of the multicast service, the response message corresponding to the first terminal is a second response message, and the second response message is used to indicate that the first terminal rejects to receive the multicast service through the multicast mode.

Optionally, the determining a target mode of the multicast service based on the response message includes:

determining, based on the response message, a quantity value of the first terminals that agree to receive the multicast service through the multicast mode; and when the quantity value is greater than a first preset value, determining that the transmission mode includes the multicast mode.

Optionally, in a case that the target mode includes the multicast mode, the method further includes:

establishing a multicast mode data channel of the multicast service.

Optionally, the method further includes:

sending indication information to the first terminal, where the indication information is used to indicate the first terminal within a service area of the multicast service to receive the multicast service in the multicast or unicast mode.

Optionally, after the sending a unicast-to-multicast request for a multicast service to a first terminal, the method further includes:

deactivating a unicast mode data channel corresponding to the first terminal when a request message sent by the first terminal has been received, where the request message is used to deactivate the unicast mode data channel.

Optionally, the first terminal is a terminal that receives the multicast service in the unicast mode.

It should be noted that this embodiment serves as an implementation of the network device corresponding to the embodiment shown in FIG. 2. For the specific implementation of this embodiment, reference may be made to related description of the embodiment shown in FIG. 2, with the same effects achieved. To avoid repetition, details are not described herein again.

Referring to FIG. 5, FIG. 5 is a structural diagram of a first terminal according to an embodiment of the present disclosure. As shown in FIG. 5, the first terminal 500 includes:

a first receiving module 501, configured to receive a unicast-to-multicast request sent by a network device for a multicast service; and receive the multicast service through a target mode, where the target mode includes a unicast mode and/or a multicast mode.

Optionally, the first terminal 500 further includes:

a first determining module, configured to: after the unicast-to-multicast request sent by the network device for the multicast service is received, determine the target mode based on a service area of the multicast service.

Optionally, the first terminal 500 further includes:

a second sending module, configured to send a first response message to the network device when the first terminal is within the service area of the multicast service, where the first response message is used to indicate that the first terminal agrees to receive the multicast service through the multicast mode.

Optionally, the target mode includes the unicast mode and the multicast mode.

Optionally, the first terminal 500 further includes:

a third sending module, configured to send a second response message to the network device when the first terminal is within the service area of the multicast service, where the second response message is used to indicate that the first terminal rejects to receive the multicast service through the multicast mode.

Optionally, the first terminal 500 further includes:

a fourth sending module, configured to send a second response message to the network device when the first terminal is outside the service area of the multicast service, where the second response message is used to indicate that the first terminal rejects to receive the multicast service through the multicast mode.

Optionally, the first terminal 500 further includes:

a fifth sending module, configured to send a second multicast session join request for the multicast service to the network device when the first terminal is within the service area of the multicast service.

Optionally, the first terminal 500 further includes:

a sixth sending module, configured to: in a case that the target mode includes the unicast mode and the multicast mode, send a first request message to the network device when service data of the multicast service has been received in the multicast mode, where the first request message is used to request to deactivate a unicast mode data channel.

Optionally, the first terminal 500 further includes:

a second receiving module, configured to: in a case that the target mode includes the unicast mode and the multicast mode, receive the multicast service through the unicast mode when no service data of the multicast service has been received in the multicast mode in a preset time period.

Optionally, the first terminal 500 further includes:

a seventh sending module, configured to: in a case that the target mode includes the unicast mode and the multicast mode, send a second request message to the network device when service data of the multicast service has been received in the multicast mode in a preset time period, where the second request message is used to deactivate a unicast mode data channel.

Optionally, the first terminal 500 further includes:

a third receiving module, configured to: in a case that the target mode includes the unicast mode and the multicast mode, receive the multicast service through the multicast mode when the first terminal is within the service area of the multicast service and has received first indication information sent by the network device; and an eighth sending module, configured to send a third request message to the network device, where the third request message is used to deactivate a unicast mode data channel; where the first indication information is used to indicate to receive the multicast service through the multicast mode.

Optionally, the first terminal 500 further includes:

a fourth receiving module, configured to: in a case that the target mode includes the unicast mode and the multicast mode, receive the multicast service through the unicast mode when the first terminal is within the service area of the multicast service and has received second indication information sent by the network device, where the second indication information is used to indicate to receive the multicast service through the unicast mode.

Optionally, the first terminal is a terminal that receives the multicast service in the unicast mode.

The first terminal provided in this embodiment of the present disclosure can implement the processes implemented by the first terminal in the method embodiment of FIG. 2. To avoid repetition, details are not described herein again.

Referring to FIG. 6, FIG. 6 is a structural diagram of a network device according to an embodiment of the present disclosure. As shown in FIG. 6, the network device 600 includes:

a first sending module 601, configured to send a unicast-to-multicast request for a multicast service to a first terminal, where the unicast-to-multicast request is used to trigger the first terminal to receive the multicast service through a target mode, and the target mode includes a unicast mode and/or a multicast mode.

Optionally, the first sending module 601 is specifically configured to send the unicast-to-multicast request for the multicast service to the first terminal when a first multicast session join request sent by a second terminal for the multicast service has been received.

Optionally, the first multicast session join request includes at least one of the following:

a multicast session establishment request; and a unicast session establishment request, where the unicast session establishment request carries third indication information, and the third indication information is used to indicate to establish a multicast mode data channel of the multicast service.

Optionally, the network device 600 further includes:

a fifth receiving module, configured to receive a response message sent by the first terminal for the unicast-to-multicast request;

a second determining module, configured to determine a transmission mode of the multicast service based on the response message; and a ninth sending module, configured to send the multicast service through the transmission mode, where the transmission mode includes the unicast mode and/or the multicast mode.

Optionally, when the first terminal is within a service area of the multicast service, the response message corresponding to the first terminal is a first response message, and the first response message is used to indicate that the first terminal agrees to receive the multicast service through the multicast mode.

Optionally, when the first terminal is within a service area of the multicast service, the response message corresponding to the first terminal is a second response message, and the second response message is used to indicate that the first terminal rejects to receive the multicast service through the multicast mode.

Optionally, when the first terminal is outside a service area of the multicast service, the response message corresponding to the first terminal is a second response message, and the second response message is used to indicate that the first terminal rejects to receive the multicast service through the multicast mode.

Optionally, the second determining module is specifically configured to determine, based on the response message, a quantity value of the first terminals that agree to receive the multicast service through the multicast mode; and when the quantity value is greater than a first preset value, determine that the transmission mode includes the multicast mode.

Optionally, the network device 600 further includes:

an establishment module, configured to: in a case that the target mode includes the multicast mode, establish a multicast mode data channel of the multicast service.

Optionally, the network device 600 further includes:

a tenth sending module, configured to send indication information to the first terminal, where the indication information is used to indicate the first terminal within a service area of the multicast service to receive the multicast service in the multicast or unicast mode.

Optionally, the network device 600 further includes:

a processing module, configured to deactivate a unicast mode data channel corresponding to the first terminal when a request message sent by the first terminal has been received, where the request message is used to deactivate the unicast mode data channel.

Optionally, the first terminal is a terminal that receives the multicast service in the unicast mode.

The network device provided in this embodiment of the present disclosure can implement the processes implemented by the network device in the method embodiment of FIG. 4. To avoid repetition, details are not described herein again.

Figure 7:
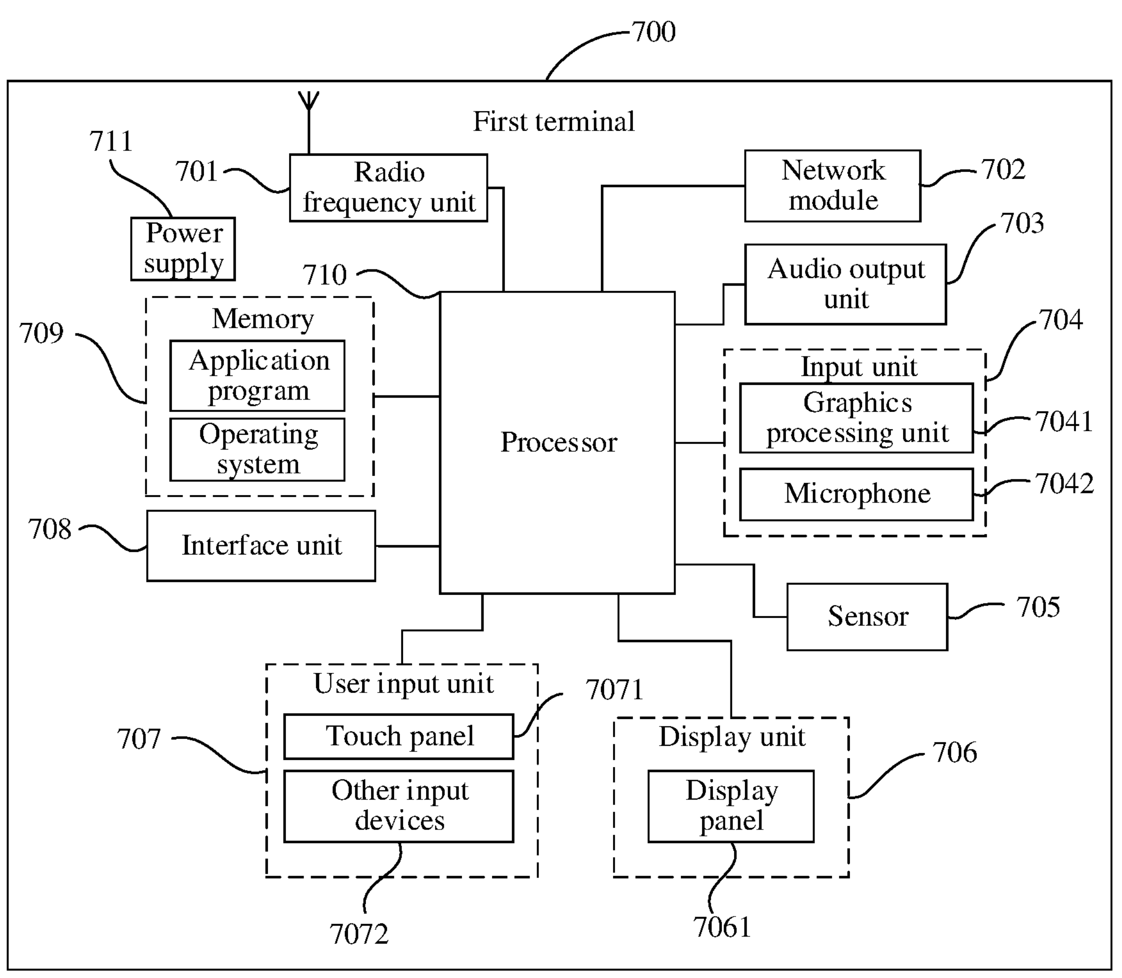
FIG. 7 is a structural diagram of another first terminal according to an embodiment of the present disclosure.

FIG. 7 is a schematic diagram of a hardware structure of a first terminal for implementing the embodiments of the present disclosure. The first terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. Persons skilled in the art can understand that the structure of the first terminal shown in FIG. 7 does not constitute any limitation on the first terminal, and the first terminal may include more or fewer components than shown in the diagram, or some components may be combined, or the components may be arranged in different manners. In this embodiment of the present disclosure, the first terminal includes but is not limited to a mobile phone, a tablet computer, a notebook computer, a palmtop computer, a vehicle-mounted terminal, a wearable device, a pedometer, or the like.

The radio frequency unit 701 is configured to receive a unicast-to-multicast request sent by a network device for a multicast service; and receive the multicast service through a target mode, where the target mode includes a unicast mode and/or a multicast mode.

It should be understood that in this embodiment, the processor 710 and the radio frequency unit 701 can implement the processes implemented by the first terminal in the method embodiment shown in FIG. 2. To avoid repetition, details are not described herein again.

It should be understood that in this embodiment of the present disclosure, the radio frequency unit 701 may be configured to receive and transmit signals in an information reception or transmission or call process. Specifically, after receiving downlink data from a base station, the radio frequency unit 701 transmits the downlink data to the processor 710 for processing, and in addition, transmits uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and other devices via a wireless communications system.

The first terminal provides a user with wireless broadband internet access by using the network module 702, for example, helping the user to transmit and receive e-mails, browse web pages, and access streaming media.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal received tone or a message received tone) that is related to a specific function performed by the first terminal 700. The audio output unit 703 includes a speaker, a buzzer, a receiver, and the like.

The input unit 704 is configured to receive an audio signal or a video signal. The input unit 704 may include a graphics processing unit (GPU) 7041 and a microphone 7042. The graphics processing unit 7041 processes image data of a static picture or a video obtained by an image capture apparatus (for example, a camera) in an image capture mode or a video capture mode. A processed image frame may be displayed on the display unit 706. The image frame processed by the graphics processing unit 7041 may be stored in the memory 709 (or another storage medium) or transmitted by using the radio frequency unit 701 or the network module 702. The microphone 7042 is capable of receiving sounds and processing such sounds into audio data. The processed audio data can be converted into a format output that can be transmitted to a mobile communication base station through the radio frequency unit 701 in a telephone call mode.

The first terminal 700 may further include at least one sensor 705, for example, an optical sensor, a motion sensor, and other sensors. Specifically, the optical sensor may include an ambient light sensor and a proximity sensor. The ambient light sensor may adjust luminance of the display panel 7061 based on brightness of ambient light, and the proximity sensor may turn off the display panel 7061 and/or backlight when the first terminal 700 moves close to an ear. As a motion sensor, an accelerometer sensor may detect magnitudes of accelerations in various directions (typically three axes), and in a stationary state, may detect the magnitude and direction of gravity, and may be applied for first terminal posture recognition (for example, switching between a landscape orientation and a portrait orientation, related gaming, and magnetometer posture calibration), vibration recognition related functions (for example, pedometer and tapping), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein again.

The display unit 706 is configured to display information input by the user or information provided to the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information, and generate a key signal input related to a user setting and function control of the first terminal. Specifically, the user input unit 707 includes a touch panel 7071 and other input devices 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, transmits the contact coordinates to the processor 710, receives a command transmitted by the processor 710, and executes the command In addition, the touch panel 7071 may be implemented in a plurality of forms, for example, as a resistive, capacitive, infrared, or surface acoustic wave touch panel. In addition to the touch panel 7071, the user input unit 707 may further include other input devices 7072. Specifically, the other input devices 7072 may include but are not limited to a physical keyboard, a function key (such as a volume control key or a switch key), a trackball, a mouse, and a joystick. Details are not described herein again.

Further, the touch panel 7071 may cover the display panel 7061. When detecting a touch operation on or near the touch panel 7071, the touch panel 7071 transmits the touch operation to the processor 710 to determine a type of a touch event. Then, the processor 710 provides a corresponding visual output on the display panel 7061 based on the type of the touch event. In FIG. 7, the touch panel 7071 and the display panel 7061 serve as two separate components to implement input and output functions of the first terminal. However, in some embodiments, the touch panel 7071 and the display panel 7061 may be integrated to implement the input and output functions of the first terminal. This is not specifically limited herein.

The interface unit 708 is an interface between an external apparatus and the first terminal 700. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 708 may be configured to receive an input (for example, data information or power) from an external apparatus, and transmit the received input to one or more components in the first terminal 700, or may be configured to transmit data between the first terminal 700 and an external apparatus.

The memory 709 may be configured to store software programs and various data. The memory 709 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 709 may include a high-speed random access memory, and may further include a non-volatile memory such as a disk storage device, a flash memory device, or another volatile solid-state storage device.

The processor 710 is a control center of the first terminal, and is connected to all components of the first terminal by using various interfaces and lines. By running or executing a software program and/or a module stored in the memory 709 and invoking data stored in the memory 709, the processor 710 executes various functions of the first terminal and processes data, so as to perform overall monitoring on the first terminal. The processor 710 may include one or more processing units. Preferably, the processor 710 may integrate an application processor and a modem processor. The application processor mainly processes an operating system, a user interface, an application program, and the like. The modem processor mainly processes wireless communication. It can be understood that the modem processor may alternatively be not integrated in the processor 710.

The first terminal 700 may further include a power supply 711 (for example, a battery) that supplies power to the components. Preferably, the power supply 711 may be logically connected to the processor 710 through a power management system, so as to implement functions such as charging management, discharging management, and power consumption management through the power management system.

In addition, the first terminal 700 includes some functional modules that are not shown. Details are not described herein again.

Preferably, an embodiment of the present disclosure further provides a first terminal, including a processor 710, a memory 709, and a computer program stored in the memory 709 and capable of running on the processor 710. When the computer program is executed by the processor 710, the processes of the embodiment of the transmission method of multicast service are implemented, with the same technical effects achieved. To avoid repetition, details are not described herein again.

Figure 8:
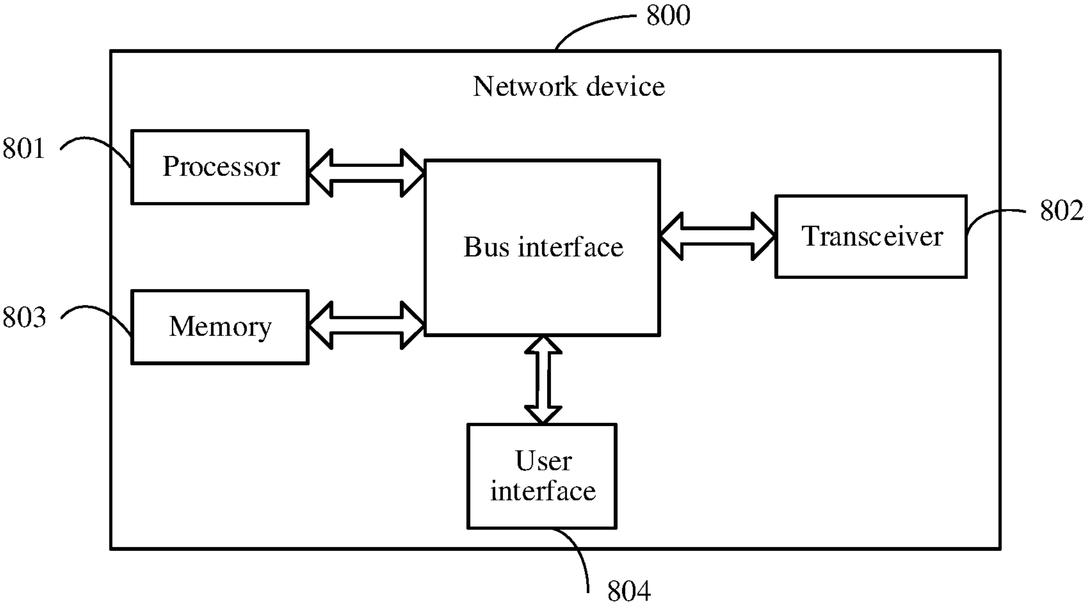
FIG. 8 is a structural diagram of another network device according to an embodiment of the present disclosure.

Referring to FIG. 8, FIG. 8 is a structural diagram of another network device according to an embodiment of the present disclosure. As shown in FIG. 8, the network device 800 includes a processor 801, a transceiver 802, a memory 803, and a bus interface.

The transceiver 802 is configured to send a unicast-to-multicast request for a multicast service to a first terminal, where the unicast-to-multicast request is used to trigger the first terminal to receive the multicast service through a target mode, and the target mode includes a unicast mode and/or a multicast mode.

It should be understood that in this embodiment, the processor 801 and the transceiver 802 can implement the processes implemented by the network device in the method embodiment shown in FIG. 4. To avoid repetition, details are not described herein again.

In FIG. 8, a bus architecture may include any quantity of interconnected buses and bridges, and specifically connect together various circuits of one or more processors represented by the processor 801 and a memory represented by the memory 803. The bus architecture may further interconnect various other circuits such as a peripheral device, a voltage regulator, and a power management circuit. These are all common sense in the art, and therefore are not further described in this specification. The bus interface provides an interface. The transceiver 802 may be a plurality of components, that is, the transceiver 802 includes a transmitter and a receiver, and provides a unit for communicating with various other apparatuses on a transmission medium. For different user equipment, the user interface 804 may also be an interface that can be externally or internally connected to a required device, and the connected device includes but is not limited to a keypad, a display, a speaker, a microphone, a joystick, and the like.

The processor 801 is responsible for bus architecture management and general processing. The memory 803 may store data used when the processor 801 performs an operation.

Preferably, an embodiment of the present disclosure further provides a network device, including a processor 801, a memory 803, and a computer program stored in the memory 803 and capable of running on the processor 801. When the computer program is executed by the processor 801, the processes of the embodiment of the transmission processing method of multicast service are implemented, with the same technical effects achieved. To avoid repetition, details are not described herein again.

An embodiment of the present disclosure further provides a computer-readable storage medium. The computer-readable storage medium stores a computer program, and when the computer program is executed by a processor, the processes of the embodiment of the transmission method of multicast service on a terminal side provided in the embodiments of the present disclosure are implemented, or when the computer program is executed by a processor, the processes of the embodiment of the transmission processing method of multicast service on a network device side provided in the embodiments of the present disclosure are implemented, with the same technical effects achieved. To avoid repetition, details are not described herein again. For example, the computer-readable storage medium is a read-only memory (ROM), a random access memory (RAM), a magnetic disk, or an optical disc.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, persons skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present disclosure essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of the present disclosure.

The embodiments of the present disclosure are described above with reference to the accompanying drawings, but the present disclosure is not limited to the foregoing implementations. The foregoing embodiments are only illustrative rather than restrictive. Inspired by the present disclosure, persons of ordinary skill in the art can still derive many variations without departing from the essence of the present disclosure and the protection scope of the claims. All these variations shall fall within the protection of the present disclosure.

What is claimed is:

1. A transmission method of multicast service, performed by a first terminal and comprising:

receiving a unicast-to-multicast request sent by a network device for a multicast service; and receiving the multicast service through a target mode, wherein the target mode comprises at least one of a unicast mode or a multicast mode;

wherein after the receiving a unicast-to-multicast request sent by a network device for a multicast service, the method further comprises:

determining the target mode based on a service area of the multicast service;

wherein the method further comprises:

sending a second response message to the network device when the first terminal is within the service area of the multicast service, wherein the second response message is used to indicate that the first terminal rejects to receive the multicast service through the multicast mode;

or sending a second multicast session join request for the multicast service to the network device when the first terminal is within the service area of the multicast service;

wherein in a case that the target mode comprises the unicast mode and the multicast mode, the method further comprises:

receiving the multicast service through the unicast mode when no service data of the multicast service has been received in the multicast mode in a preset time period;

wherein after receiving the unicast-to-multicast request, the first terminal starts the timer; if the first terminal receives no service data of the multicast service in the multicast mode before the timer expires, the first terminal still uses the unicast mode to receive the multicast service, and no longer attempts to receive the multicast service in the multicast mode.

2. The method according to claim 1, wherein the target mode comprises the unicast mode and the multicast mode.

3. The method according to claim 1, further comprising:

sending a second response message to the network device when the first terminal is outside the service area of the multicast service, wherein the second response message is used to indicate that the first terminal rejects to receive the multicast service through the multicast mode.

4. The method according to claim 1, wherein in the case that the target mode comprises the unicast mode and the multicast mode, the method further comprises:

sending a first request message to the network device when service data of the multicast service has been received in the multicast mode, wherein the first request message is used to request to deactivate a unicast mode data channel.

5. The method according to claim 1, wherein in the case that the target mode comprises the unicast mode and the multicast mode, the method further comprises:

sending a second request message to the network device when service data of the multicast service has been received in the multicast mode in a preset time period, wherein the second request message is used to deactivate a unicast mode data channel.

6. The method according to claim 1, wherein in the case that the target mode comprises the unicast mode and the multicast mode, the method further comprises:

receiving the multicast service through the multicast mode when the first terminal is within the service area of the multicast service and has received first indication information sent by the network device; and sending a third request message to the network device, wherein the third request message is used to deactivate a unicast mode data channel; wherein the first indication information is used to indicate to receive the multicast service through the multicast mode;

or wherein in the case that the target mode comprises the unicast mode and the multicast mode, the method further comprises:

receiving the multicast service through the unicast mode when the first terminal is within the service area of the multicast service and has received second indication information sent by the network device, wherein the second indication information is used to indicate to receive the multicast service through the unicast mode.

7. The method according to claim 1, wherein the first terminal is a terminal that receives the multicast service in the unicast mode.

8. A transmission processing method of multicast service, performed by a network device and comprising:

sending a unicast-to-multicast request for a multicast service to a first terminal, wherein the unicast-to-multicast request is used to trigger the first terminal to receive the multicast service through a target mode, and the target mode comprises at least one of a unicast mode or a multicast mode;

wherein after the sending a unicast-to-multicast request for a multicast service to a first terminal, the method further comprises:

receiving a response message sent by the first terminal for the unicast-to-multicast request;

determining a transmission mode of the multicast service based on the response message; and sending the multicast service through the transmission mode, wherein the transmission mode comprises at least one of the unicast mode or the multicast mode;

wherein when the first terminal is within a service area of the multicast service, the response message corresponding to the first terminal is a second response message, and the second response message is used to indicate that the first terminal rejects to receive the multicast service through the multicast mode; or, wherein when the first terminal is within a service area of the multicast service, the response message corresponding to the first terminal is a first response message, and the first response message is used to indicate that the first terminal agrees to receive the multicast service through the multicast mode; or, wherein when the first terminal is outside a service area of the multicast service, the response message corresponding to the first terminal is a second response message, and the second response message is used to indicate that the first terminal rejects to receive the multicast service through the multicast mode;

wherein the determining a transmission mode of the multicast service based on the response message comprises:

determining, based on the response message, a quantity value of first terminals that agree to receive the multicast service through the multicast mode; and when the quantity value is greater than a first preset value, determining that the transmission mode comprises the multicast mode.

9. The method according to claim 8, wherein the sending a unicast-to-multicast request for a multicast service to a first terminal comprises:

sending the unicast-to-multicast request for the multicast service to the first terminal when a first multicast session join request sent by a second terminal for the multicast service has been received.

10. The method according to claim 9, wherein the first multicast session join request comprises at least one of the following:

a multicast session establishment request; and a unicast session establishment request, wherein the unicast session establishment request carries third indication information, and the third indication information is used to indicate to establish a multicast mode data channel of the multicast service.

11. The method according to claim 8, wherein in a case that the target mode comprises the multicast mode, the method further comprises:

establishing a multicast mode data channel of the multicast service.

12. The method according to claim 8, wherein the method further comprises:

sending indication information to the first terminal, wherein the indication information is used to indicate the first terminal within a service area of the multicast service to receive the multicast service in the multicast or unicast mode; and wherein after the sending a unicast-to-multicast request for a multicast service to a first terminal, the method further comprises:

deactivating a unicast mode data channel corresponding to the first terminal when a request message sent by the first terminal has been received, wherein the request message is used to deactivate the unicast mode data channel.

13. A first terminal, comprising a memory, a processor, and a program stored in the memory and capable of running on the processor, wherein when the program is executed by the processor, the following steps are implemented:

receiving a unicast-to-multicast request sent by a network device for a multicast service; and receiving the multicast service through a target mode, wherein the target mode comprises at least one of a unicast mode or a multicast mode;

wherein after the receiving a unicast-to-multicast request sent by a network device for a multicast service, the processor is further configured to perform the following step:

determining the target mode based on a service area of the multicast service;

wherein the processor is further configured to perform the following step:

sending a second response message to the network device when the first terminal is within the service area of the multicast service, wherein the second response message is used to indicate that the first terminal rejects to receive the multicast service through the multicast mode;

or sending a second multicast session join request for the multicast service to the network device when the first terminal is within the service area of the multicast service;

wherein in a case that the target mode comprises the unicast mode and the multicast mode, the processor is further configured to perform the following step:

receiving the multicast service through the unicast mode when no service data of the multicast service has been received in the multicast mode in a preset time period;

wherein after receiving the unicast-to-multicast request, the first terminal starts the timer; if the first terminal receives no service data of the multicast service in the multicast mode before the timer expires, the first terminal still uses the unicast mode to receive the multicast service, and no longer attempts to receive the multicast service in the multicast mode.

14. A network device, comprising a memory, a processor, and a program stored in the memory and capable of running on the processor, wherein when the program is executed by the processor, the steps of the transmission processing method of multicast service according to claim 8 are implemented.

* * * * *